W. KENWORTHY.
Tap.

No. 224,921.   Patented Feb. 24, 1880.

WITNESSES:
C. Neveux
C. Sedgwick

INVENTOR:
W. Kenworthy
BY Munn & Co.
ATTORNEYS.

UNITED STATES PATENT OFFICE.

WILLIAM KENWORTHY, OF BROOKLYN, NEW YORK, ASSIGNOR TO HIMSELF AND RUSSELL R. BROWN, OF SAME PLACE.

TAP.

SPECIFICATION forming part of Letters Patent No. 224,921, dated February 24, 1880.

Application filed December 6, 1879.

*To all whom it may concern:*

Be it known that I, WILLIAM KENWORTHY, of Brooklyn, in the county of Kings and State of New York, have invented a new and Improved Tap, of which the following is a specification.

My invention relates to machine and hand taps to be used in cutting internal or female screw-threads.

It consists in a tap having two or more threaded sections separated by clearance-spaces, or spaces without threads, the object being to facilitate the escape of chips from the tap and from the threads being cut.

My improvement is applicable to taps of every variety—such as taper, plug, and bottoming taps; but it is especially designed for the class of taps having two or more threaded sections of different diameters, each section having a uniform diameter throughout its length.

Figure 1:
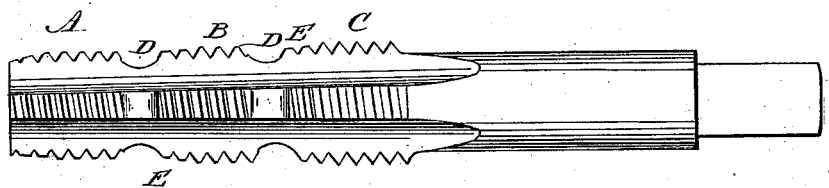
Figure 2:
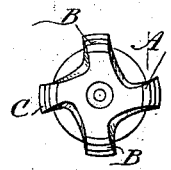

In the drawings, Figure 1 is a side elevation, and Fig. 2 an end view, of a tap embodying my invention.

Similar letters of reference indicate corresponding parts.

It will be seen that the threaded portion of the tap is divided up into sections A B C, differing in diameter. The section A, which first enters the hole to be tapped, is smallest; the second section, B, is larger than the first section, and the third section, C, is larger than the second section. The screw-threads of each section, as they come from the lathe in which they are formed, are of uniform diameter throughout, and the threads of one section join the threads of the next. When a tap of this description is fluted, and the apices of the threads at the end of the tap are cut away, as usual, it will invariably clog. To avoid this difficulty, and to increase the capacity of the tap, I form between the threaded sections a circumferential groove, D, which is deeper and wider than the threads, and I cut away the apices of the threads E adjoining these grooves, to facilitate the entrance of the successive sections to the hole to be tapped.

By giving the tap the form indicated the strain and wear upon it are reduced, and the work is distributed throughout its entire length.

A tap of this form virtually represents as many taps as there are threaded sections in it, and a thread formed with it will be as perfect as it could be if as many separate taps were used.

It has been determined by experiment that this tap will cut from two to three times as fast as the ordinary tap without a proportionate amount of wear or expenditure of labor.

Having thus described my invention, I claim as new and desire to secure by Letters Patent—

A tap having its threads in independent sections A B C, separated by clearance-spaces D, and having each successive section from the end of increased diameter, as shown and described.

WILLIAM KENWORTHY.

Witnesses:
J. H. SCARBOROUGH,
C. SEDGWICK.